June 11, 1957    V. E. McCOY    2,795,466
LUBRICATING DEVICE

Filed May 26, 1955    3 Sheets-Sheet 1

Inventor
Verl E. McCoy by Parker & Carter
Attorneys

June 11, 1957 V. E. McCOY 2,795,466
LUBRICATING DEVICE
Filed May 26, 1955 3 Sheets-Sheet 2

Inventor
Verl E. McCoy
by Parker & Carter
Attorneys

June 11, 1957  V. E. McCOY  2,795,466
LUBRICATING DEVICE
Filed May 26, 1955  3 Sheets-Sheet 3

Inventor
Verl E. McCoy
by Parker & Carter
Attorneys

United States Patent Office 2,795,466
Patented June 11, 1957

2,795,466

LUBRICATING DEVICE

Verl E. McCoy, La Grange, Ill.

Application May 26, 1955, Serial No. 511,272

5 Claims. (Cl. 308—90)

My invention relates to lubricating devices and particularly to lubricating devices for axles of railroad cars and the like and has for one purpose the provision of a lubricating device which may be easily and quickly removed and installed.

Another purpose is to provide a lubricating device which will be effective to apply the required amount of lubricant to an axle as the rotational speed of such axle increases and decreases.

Another purpose is to provide a lubricating device which may be installed in the journal boxes of railway cars without the modification in any way of such journal boxes.

Another purpose is to provide a lubricating device which may be easily and economically manufactured and which is light in weight.

Another purpose is to provide a lubricating device having a minimum of parts and capable of withstanding a great deal of wear and tear before requiring replacement.

Another purpose is to provide means for lubricating a rotating member wherein a plurality of rounded members are movably and rotatably supported adjacent the rotatable member and are caused to rotate and move between said rotating member and a supply of lubricant in response to rotation of the rotating member.

Another purpose is to provide a means to insure the rotation and movement of a plurality of rounded members between a supply of lubricant and a rotating member in response to the rotation of the rotating member.

Other purposes will appear from time to time throughout the specification and claims.

My invention is illustrated more or less diagrammatically in the accompanying drawings, wherein.

Like parts are indicated by like characters throughout the specification and drawings.

Figure 1:
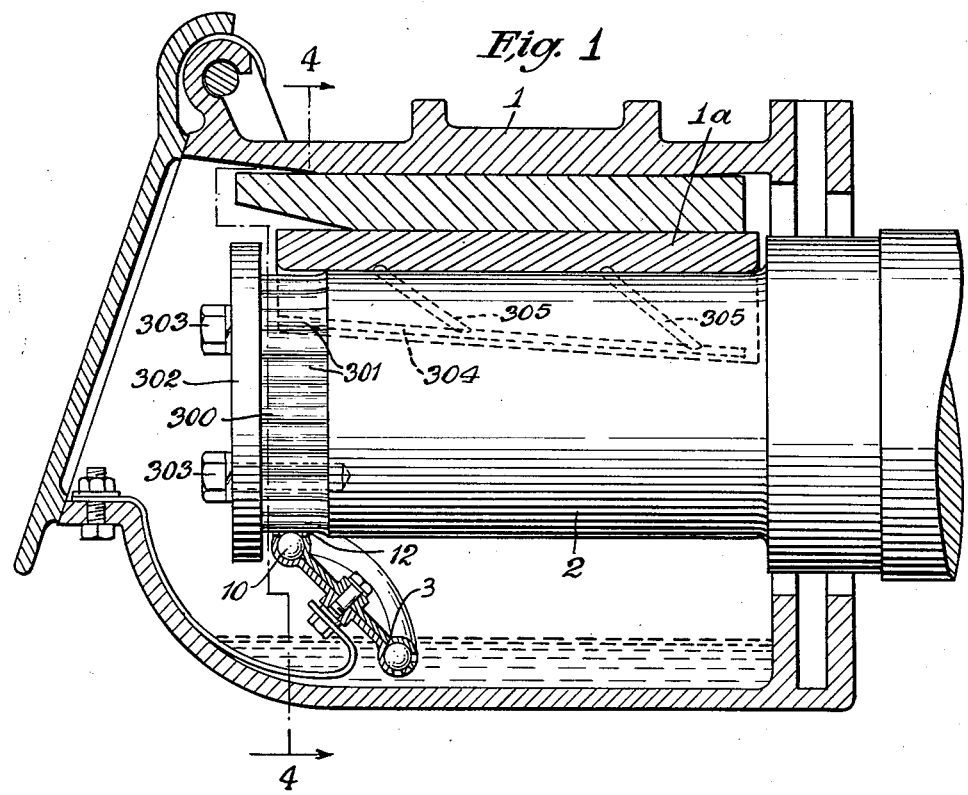
Figure 1 is a side view illustrating one means for insuring movement and rotation of members associated with my lubricating device.
Figure 4:
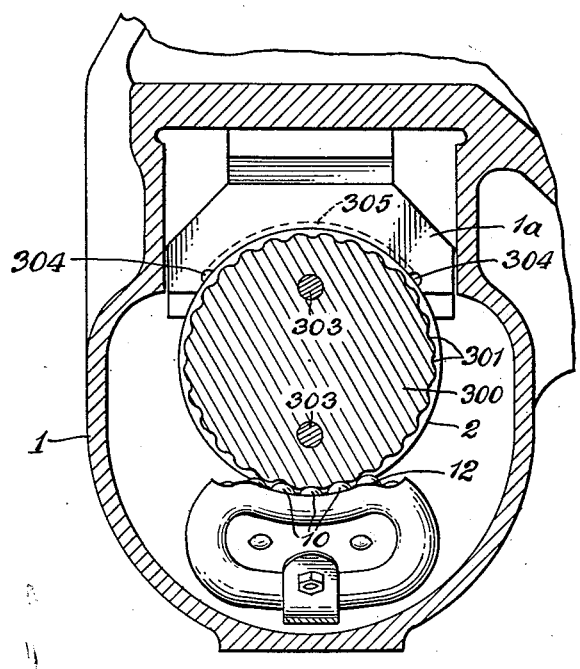
Figure 4 is a section on the line 4—4 of Figure 1.

Referring now to the structure illustrated in the accompanying drawings:

Indicated generally at 1 is a journal box of a railway car. It will be understood that my lubricating device may be utilized in a variety of structures in which a rotating member, such as an axle, must be lubricated. For purposes of illustration, however, the structure is shown as applied in the lubrication of axles of railway cars.

2 indicates an axle to be lubricated disposed within the journal box. Beneath the axle 2 is the lubricating device 3. It will be realized that the device may be installed in a variety of ways. In whatever manner the lubricating device is installed, it will be understood that one portion of the device is held in pressure contact with the axle; the axle being supported in no way by the lubricating device itself.

Indicated at 1-a is an axle bearing which, in the case of the railway car journal box illustrated, is held, as by a wedge, between the axle and the top wall of the box. It will be understood that the bearing, or bearing plate 1-a, bears downwardly upon substantially the entire portion of the axle within the journal box 1.

The lubricating device 3 is comprised of a housing which is formed of two half-shell members each of which has a peripheral trough which, when the two half-shell members are placed together, are in registration with each other to form the peripheral race. It will be seen that the housing could be formed in one piece by casting, forging or machining, the formation in two pieces being a preferred manner of construction.

Disposed within the race is a plurality of balls 10. Adjacent the lower portion, considering the device in the position which it assumes, when installed, of the lubricating device is the aperture or apertures. A portion of an outer edge of the device and the race is cut away as at 12 to an extent sufficient to permit a portion of each of the balls 10 to extend therethrough as each ball traverses the cut-away portion. This cut-away portion is of insufficient size and depth, however, to permit the escape of the balls 10 from the race or the housing.

While I show the movable and rotatable lubricant-applying members in the drawings herein as a preferred embodiment, it will be understood that other members, say rollers, may be suitably mounted for rotation and movement in a similar housing. Similarly, while I show the preferred and more efficient peripheral internal closed channel in which the balls 10 are enclosed with an opening 12 and the apertures shown, it will be seen that the opening 12 could in a particular installation be coextensive with the channel or race.

While the device may be installed in a variety of ways, I illustrate a simple and effective installation and one which is particularly efficient in railway car journal boxes and the like.

It will be realized that the device may be formed in a generally concave-convex kidney-shaped configuration, with the ends generally wider across than the mid-portion in order to present the largest number of ball-bearing surfaces to the axle and that this is the preferred, though not the exclusive, embodiment of the invention. The device is installed in a vertically inclined plane beneath the axle, as shown in Figure 1. The kidney-shaped configuration further provides a securing action preventing substantial movement of the device transversely of the axle.

Many mechanisms, such as the railway truck axle and boxcar journal-box, are subject to fluctuation, vibration and shifting of the relative position of parts to be lubricated. Thus, the lubricating device must be yieldingly held in pressure contact with the axle or item to be lubricated, and, if continuous lubrication is to be achieved, the device must be so held throughout such shifting and vibration.

I illustrate, for example, a resilient band member 500 secured at one of its ends to the journal box by the connector 501 and supporting at its opposite ends the lubricating device.

Figure 2:
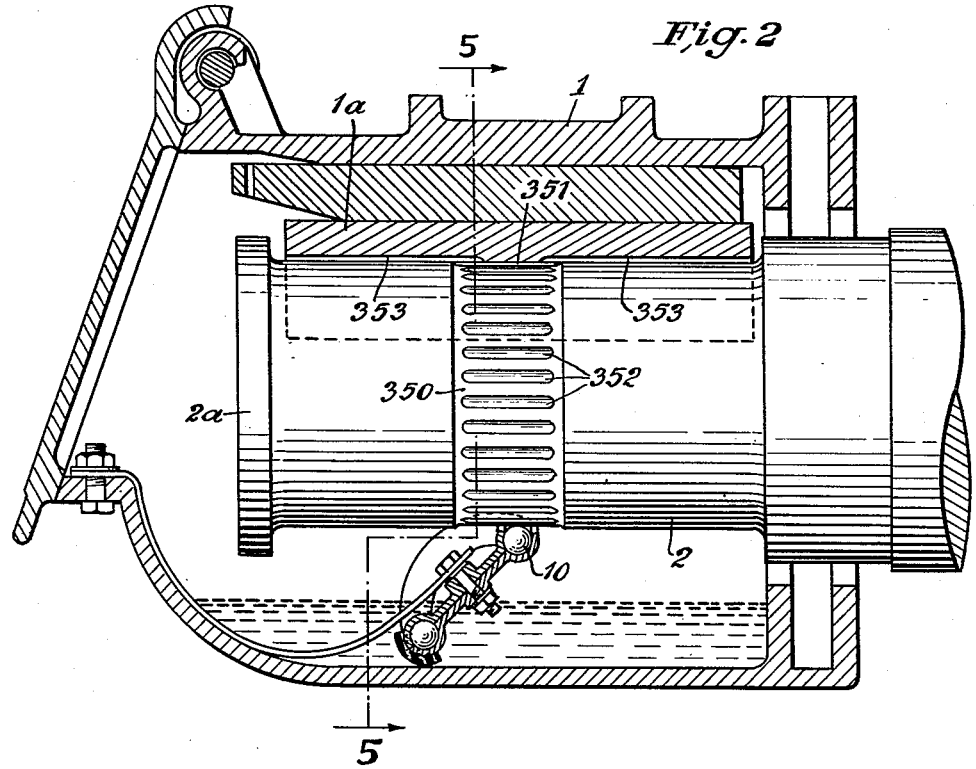
Figure 2 is a side view illustrating a variant means for insuring rotation and movement of members associated with my lubricating device, and, Figure 3 is a side view illustrating another variant means for insuring rotation and movement of members associated with my lubricating device.
Figure 5:
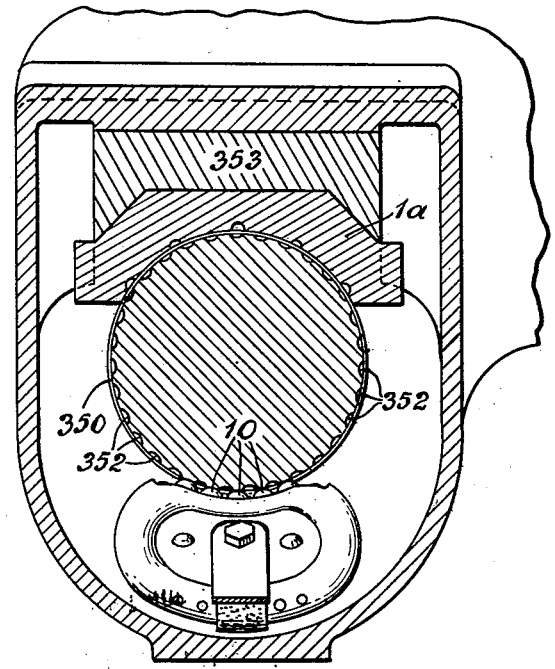
Figure 5 is a section on the line 5—5 of Figure 2.
Figure 3:
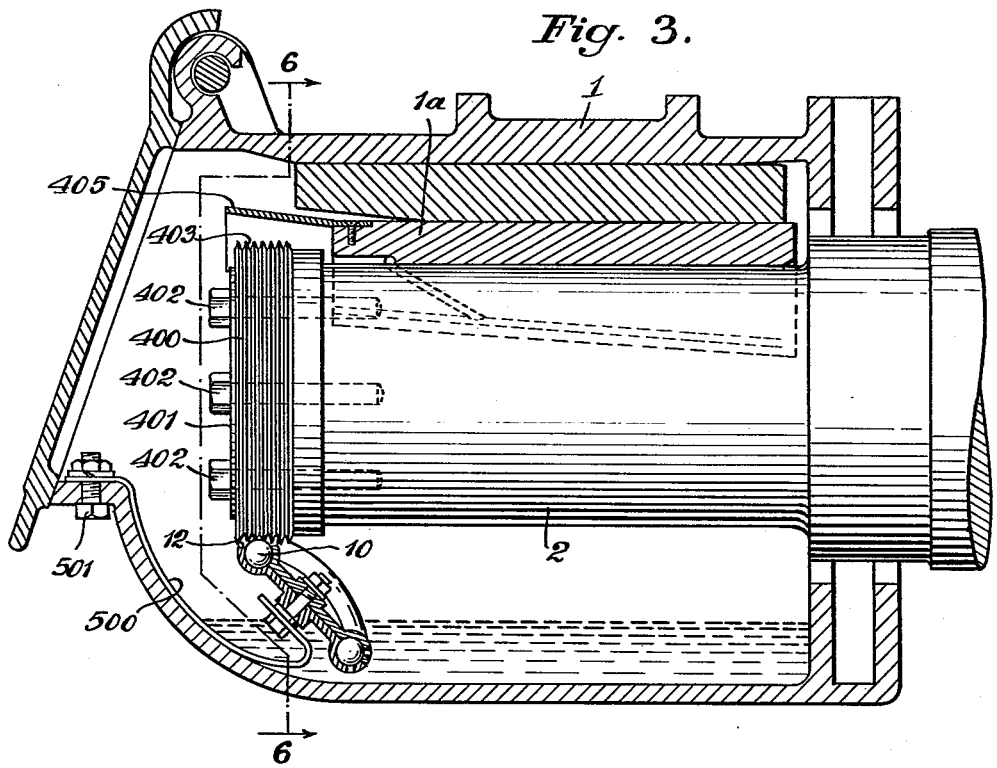
Figure 6:
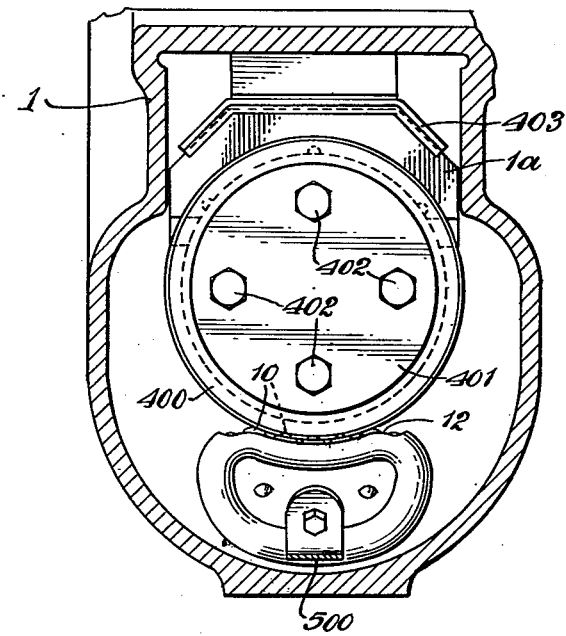
Figure 6 is a section on the line 6—6 of Figure 3.
Figure 7:
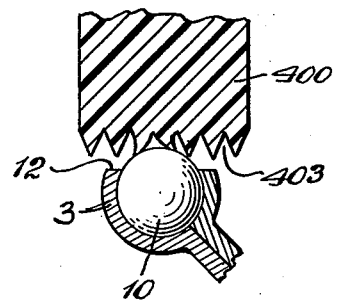
Figure 7 is a detail on an enlarged scale.

Referring now to Figures 1–3 inclusive, I illustrate means for insuring rotation and movement of the balls 10 in response to rotation of the axle 2. Referring particularly to Figure 1, the numeral 300 designates a circular member having a corrugated peripheral edge 301.

It will be understood that the corrugated member 300 may be a portion of the shaft 2. I find it expedient however to form the corrugated edge as a part of a cap or a button 302 secured to the outer end of the shaft 2 by the fasteners 303. It will be observed that the balls 10 are caused, due to the positioning of the lubricating device, to contact the corrugations 301 as the balls pass through the opening 12 in the housing. The axle bearing 1a may have one or more longitudinal oil grooves 304 positioned to receive oil from the corrugations 301 and to convey oil between the bearing 1a and the axle 2. A number of diagonal grooves 305 may also be formed in the bearing 1a to similarly deposit oil across the opposed surface of the axle 2. It will be realized that the balls 10 are effective to transfer oil from the lubricant or oil supply in the bottom of the box 1 to the corrugations 301. It will be realized that the number of corrugations or ridges or grooves in the peripheral edge of the disc 300 may be varied, the important thing being that a positive drive of the balls 10 is created by engagement of the elements 301 with the balls 10 as they pass along the opening 12 in the lubricant device housing.

In Figure 2 the axle 2 may have formed completely about its periphery a band or series of spaced recesses or generally oblong-shaped wells 352. A peripheral recess 350 creates a space between the bearing 1a and the bottom of the recess, the space being designated by the numeral 351. Thus any roughening about the individual wells or indentations 352 will not come into contact with the bearing 1a. The balls 10 are caused to engage the shaft areas between the individual recesses 352 as the shaft rotates providing a direct drive of the balls 10 through the race of the lubricating device and at the same time depositing lubricant on the shaft in alignment with the individual oblong recesses 352 and within the wider recess 350. As described in relation to Figure 1, the bearing 1a may have longitudinal grooves 353 formed therein to conduct oil from the peripheral shaft recess 350 across the shaft bearing surfaces opposed to the bearing 1a. The recess 350 and individual wells or indentations 352 are of sufficient extension longitudinally of the shaft 2 to insure engagement of the balls 10 with the shaft areas between the elements 352 even though the shaft 2, during operation of the box car or railroad car to which it is attached is caused to shift its position longitudinally of the box 1 and the centers of the individual recesses 352 are spaced apart a distance substantially equal to the distance between centers of the balls 10.

Referring now to Figure 3, the numeral 400 generally designates a disc formed of a compressible material. The disc 400 may be clamped against the outer end of the axle 2 by means of a plate 401 and fasteners 402. The peripheral edge of the disc 400 may have a circumferential groove or grooves 403 formed therein although it will be understood that the peripheral edge of the disc 400 may be in a variety of forms without departing from the nature and scope of my invention. The balls 10 are caused to engage the peripheral edge of the disc 400 as they move through the opening 12 in the device housing. The material of the disc 400 will indent for each ball as the ball contacts the disc 400 and passes along the opening 12 of the lubricating device to provide a type of positive drive of the ball through the housing of the lubricating device. A trough or receiver member 405 may be positioned adjacent the peripheral edge of the disc 400 to receive oil thrown by centrifugal force from the disc 400 and to conduct the oil to the axle bearing 1a.

In Figures 1, 2, and 3, the lubricating device is shown as being flexibly supported on a metallic strip or leaf spring member 500, one end of which is connected to the lubricating device and the opposite end of which may be secured, as shown by the fasteners 501, to the axle housing forward position 1b.

The use and operation of my invention are as follows:

The device 3 is placed in position by bringing the cutaway portion 12 of the housing in alignment with and adjacent to the member to be lubricated, which, in the case illustrated, is the axle 2. The device is brought close enough to the axle to permit the balls 10 to be in pressure contact with such axle. This is easily accomplished in the embodiment and employment illustrated, since it is necessary only to open the end door of the journal box, insert the device 3 and its support, which easily fit through the door. As the axle rotates, the balls 10 are caused to rotate and to move through the race or track. As the balls pass through the race, they are coated with lubricant. As the balls 10 thereafter make contact with the axle 2, the lubricant thus acquired is applied to the axle. The lubricant is carried through rotation of the axle, upwardly and under the bearing 1-a, the pressure contact of the bearing against the axle and the lateral shifting of the axle relative to the bearing causing the lubricant to spread laterally over substantially the entire portion of the axle within the journal box. As rotational speed of the axle increases, the individual rotational speed and the speed of the balls 10 through the race, likewise increase and a greater amount of oil is applied to the axle.

In Figures 1–3, I illustrate means for insuring rotation and movement of the balls 10 through the race of my lubricating device. The structures of these figures are diagrammatically illustrative of means through which more positive rotation and drive of the balls 10 are created.

I claim:

1. A lubricating system for railroad car journal boxes, wherein a railroad truck axle extends within said box, said box being substantially larger in cross-section than said axle, comprising a housing adapted to fit within said journal box between a wall of said journal box and said axle, a race of generally rounded members rotatably and movably mounted in said housing, a peripheral opening in said housing through which extends a portion of said rounded members, a supply of lubricant in said journal box and in contact with said housing, an aperture in said housing at the point of contact of said lubricant and in communication with said race, a resilient support connected to said housing and formed and positioned to maintain a portion of said rounded members which extends through said opening yieldingly in pressure contact with said axle as said rounded members are forced to traverse said opening by rotation of the axle against said rounded members, said axle having conformations in contact with said rounded members as said axle rotates and effective frictionally to impel said rounded members along said opening.

2. In combination, a rotatable member, a bearing for said rotatable member and lubricating means for said rotatable member and bearing including a lubricant reservoir containing a supply of lubricant, a housing positioned between said lubricant supply and said rotatable member, a plurality of balls in said housing, an opening in an edge of said housing, adjacent said rotatable member, through which said balls extend, support means for said housing positioned to maintain said balls in contact with said rotatable member, a peripheral recess in said rotatable member in alignment with said balls as they contact said rotatable member and a plurality of individual smaller recesses spaced peripherally about said rotatable member within said first recess, said balls being in contact with the areas of said rotatable member between said individual recesses.

3. In combination a rotatable member, a bearing for said rotatable member and means for lubricating said rotatable member and bearing including a lubricant reservoir positioned adjacent said rotatable member, a supply of lubricant in said reservoir adjacent and spaced from said rotatable member and means for supplying lubricant from said supply to said rotatable member, said means including a race of balls, means for supporting said race of balls positioned to permit said balls to contact an element on said rotatable member, said element including a circular disc secured to said rotatable member and formed of a compressible material, said lubricating means including a receiver member positioned to receive oil thrown from said disc in response to rotation of said rotatable member and said disc, said receiver member being positioned to conduct oil received from said disc to said bearing.

4. In combination a rotatable member, a bearing for said rotatable member and means for lubricating said rotatable member and bearing, including a lubricant reservoir positioned adjacent said rotatable member, a supply of lubricant in said reservoir adjacent said rotatable member and means for supplying lubricant from said supply to said rotatable member, said means including a race of balls, means for supporting said race of balls and positioning to permit said balls to contact an element on said rotatable member, said element including a disc mounted for rotation with said rotatable member, said disc having a corrugated peripheral edge positioned to engage said balls, said bearing having a plurality of grooves therein positioned to receive oil from said corrugations.

5. In combination a rotatable member, a bearing for said rotatable member and means for lubricating said rotatable member and bearing, including a lubricant reservoir positioned adjacent said rotatable member, a supply of lubricant in said reservoir adjacent said rotatable member and means for supplying lubricant from said supply to said rotatable member, said second means including a circuitous track extending between said lubricant supply and said rotatable member, a plurality of rounded members rotatably and movably mounted on said track for movement between said lubricant and said rotatable member, said rotatable member having formations therein positioned to frictionally engage said rounded members to receive lubricant from the latter and to urge said rounded members along said track in response to rotation of said rotatable member.

References Cited in the file of this patent
UNITED STATES PATENTS

| | | |
|---|---|---|
| 713,183 | Wands | Nov. 11, 1902 |
| 864,778 | Gamage | Sept. 3, 1907 |
| 1,185,114 | McIlwain | May 30, 1916 |
| 2,744,798 | McCoy | May 8, 1956 |

FOREIGN PATENTS

| | | |
|---|---|---|
| 335,953 | Germany | Apr. 26, 1921 |
| 488,310 | Germany | July 7, 1928 |